Figure 1:
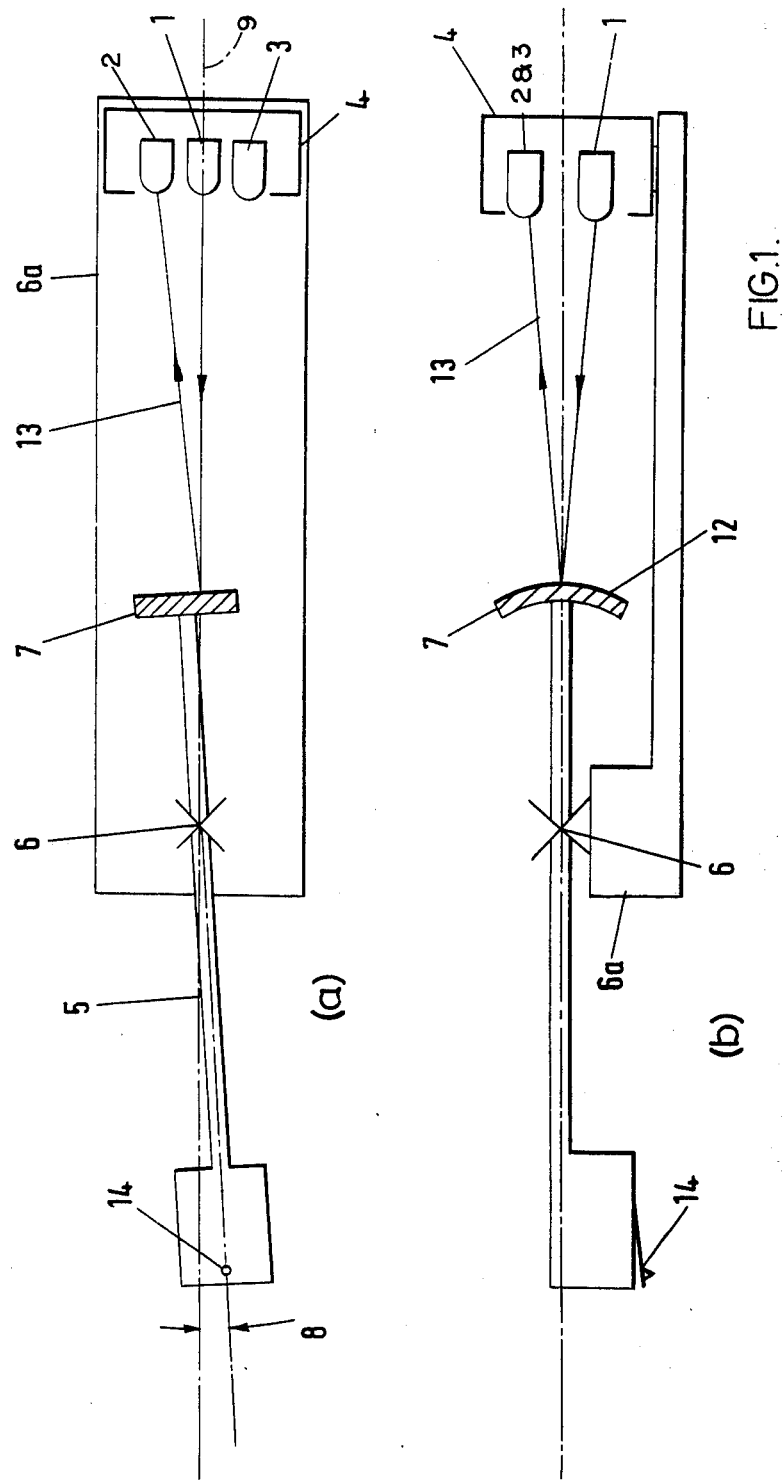

United States Patent [19]

Stanwell-Smith et al.

[11] 4,032,158
[45] June 28, 1977

[54] METHOD AND APPARATUS FOR INDICATING ANGULAR DISPLACEMENT

[75] Inventors: Colin Howard Stanwell-Smith, Cambridge; Dexter Robert Plummer, Ongar; Frederick James Easthope, Cambridge; Jonathan Humfrey Pope, Fulbourn, all of England

[73] Assignee: Strathearn Audio Limited, Belfast, Ireland

[22] Filed: Sept. 3, 1975

[21] Appl. No.: 610,091

[30] Foreign Application Priority Data

Sept. 5, 1974 United Kingdom ............ 38850/74

[52] U.S. Cl. .............................. 274/23 A; 250/230; 250/237 G
[51] Int. Cl.² ...................... G11B 3/10; G01D 5/30
[58] Field of Search ...................... 274/13 R, 23 A; 250/230, 237 G

[56] References Cited

UNITED STATES PATENTS

| | | | |
|---|---|---|---|
| 2,113,436 | 4/1938 | Williams | 250/230 |
| 2,651,019 | 9/1953 | Fink | 250/230 |
| 3,535,538 | 10/1970 | Filloux | 250/230 |
| 3,572,724 | 3/1971 | Rabinow | 274/13 R |
| 3,768,911 | 10/1973 | Erickson | 250/237 G |
| 3,850,435 | 11/1974 | Birch | 274/23 A |

OTHER PUBLICATIONS

The Servo Groove Tracker, A. G. Johnson, Audio, May 1966, pp. 21, 22.

*Primary Examiner*—Steven L. Stephan
*Attorney, Agent, or Firm*—Cushman, Darby & Cushman

[57] ABSTRACT

A tone arm for a record player having a mirror at one end is provided. Opposite the mirror are a light source and two detector elements. When the tone are pivots from a desired angle light from the source is reflected upon the element more than on the other. The mirror is convexly curved so that pivotal motions of the tone arm in one plane will not affect the amount of light reaching the detectors.

3 Claims, 4 Drawing Figures

METHOD AND APPARATUS FOR INDICATING ANGULAR DISPLACEMENT

This invention relates to a method and apparatus which is suitable for use in providing a signal which indicates an angular displacement and it is particularly, though not exclusively, applicable to the control of a parallel tracking arm carrying a pick-up stylus in a phonograph apparatus.

The longitudinal axis of an arm carrying a stylus is ideally maintained at a controlled angle, preferably tangential, to the groove on a record in which the stylus is located when the record is being played. Even parallel tracking arms, which are moved by an actuator during the playing of a record, require to be controlled in such a way that a desired positioning of the arm is maintained, and the present invention provides arrangements, which are particularly suitable for use with such arms, in which the angle between the true tangent to a record groove, at the point where the stylus is in contact with the groove, and the instantaneous longitudinal axis of the arm in the plane of the record is measured. This measured angle, which is referred to herein as the angle of error, can be translated into an electrical signal and used in a servo-system for controlling the arm actuator.

Figure 2:
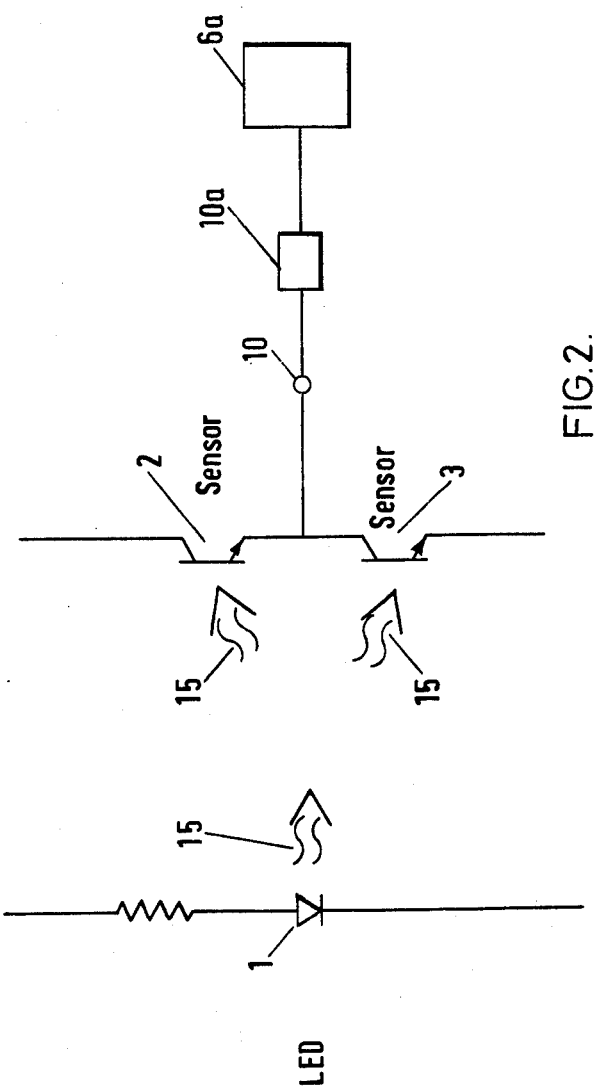
Figure 3:
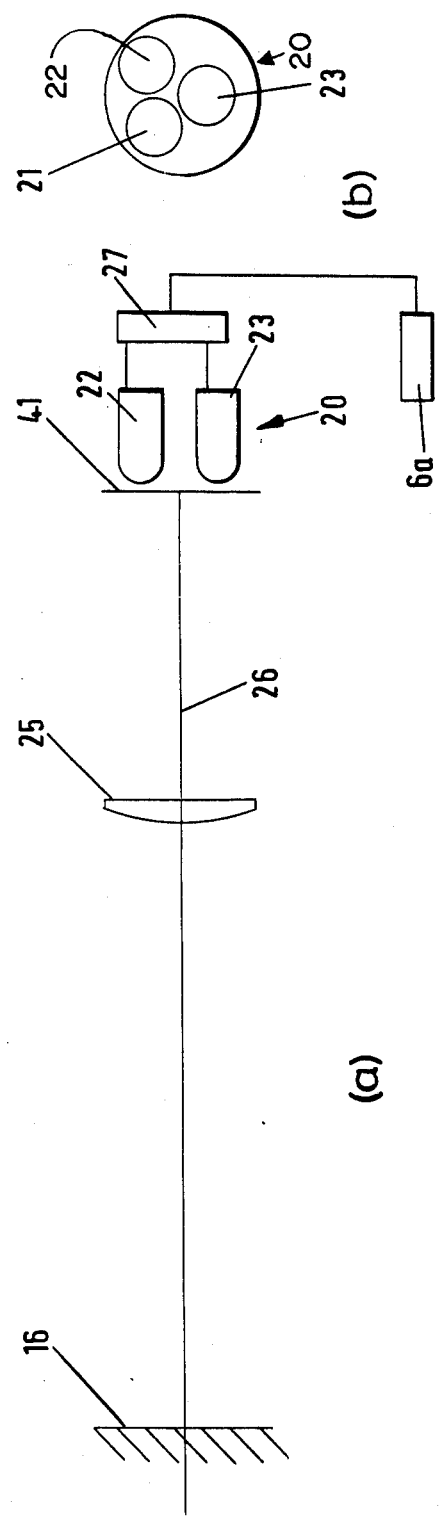
Figure 4:
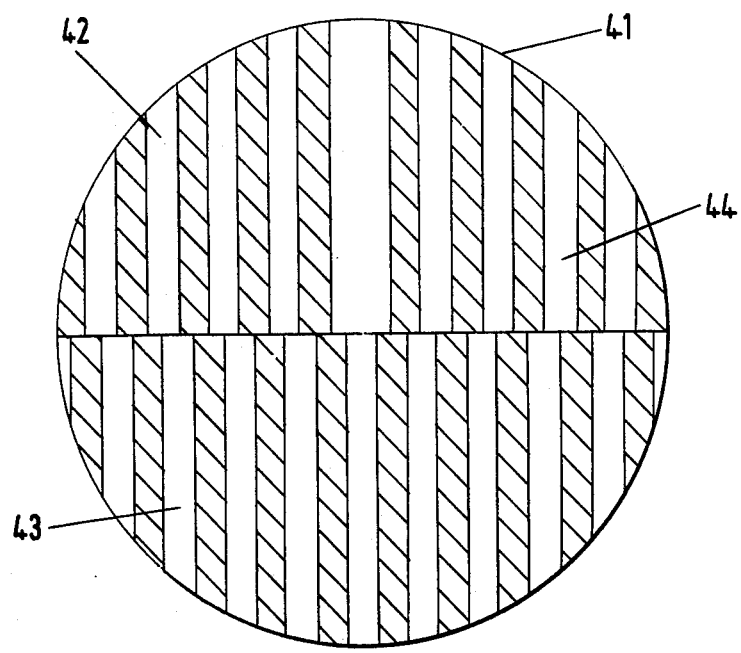

Embodiments of the invention will now be described, by way of example, with reference to the accompanying drawings in which:

FIG. 1 shows diagrammatically at (a) and (b) a plan view and a side elevation respectively of an error detection arrangement, FIG. 2 shows diagrammatically an electric circuit arrangement, FIG. 3 shows diagrammatically at (a) and (b) a side elevation of an optical system and a front elevation of a light source and sensor assembly respectively, and FIG. 4 shows a front elevation of a graticule used in the system shown in FIG. 3.

Referring to FIG. 1, there is shown an assembly 4 including a light source 1, which in the particular embodiment is a light emitting diode, and light sensors 2 and 3 arranged with the nominal optical axis 9 of the assembly in line with the longitudinal axis of a pick-up arm 5 in the desired position of the arm 5. The arm 5 is supported at point 6 by a gimbal or other bearing system such as a unipivot so that it is free to pivot in both the vertical and horizontal directions about the point 6. The arm 5 and the bearing system are supported by a carriage 6a which also carries the assembly 4 and moves in a direction at right angles to the axis 9. One end of the arm 5 carries a mirror 7, which, as can be seen from FIG. 1(b) has a reflecting surface 12 which is convex in the vertical plane. The other end of the arm 5 carries a cartridge which has a stylus 14.

During the playing of a record, it is possible for the tracking of the stylus 14 in a record groove to result in a deviation of the longitudinal axis of the arm 5 in the horizontal plane from the desired axis 9 to an axis, such as that indicated at 8 in FIG. 1(a). The angle between the axis 8 and the axis 9 is the angle of error for which a correction must be made, by moving an actuator (not shown) driving the carriage 6a which carries the arm 5.

It can be seen, particularly from FIG. 1(a), that the deviation of the arm 5 causes the mirror 7 to be tilted so as to increase the proportion of light 13 from the source 1 reflected on to the sensor 2 and reduce the proportion of light reflected on to the sensor 3.

The electrical arrangement of the light source 1 and the sensors 2 and 3 is indicated diagrammatically in FIG. 2. The sensors 2 and 3 are photoresistive, that is their resistance varies in relation to the light which is incident upon them. Thus the two sensors act as a variable potential divider and it will thus be realised that variations in the amount of light, indicated by arrows 15 reaching the sensors 2 and 3 will cause the voltage at point 10 between the two sensors to vary accordingly. These variations in the voltage at point 10 thus provide a direct indication of the relationship of the longitudinal axis of the arm 5 in the horizontal plane to the optical axis 9 of the assembly 4 and are applied via a control circuit 10a to the actuator (not shown) of the carriage 6a to enable corrective action to be taken so as to minimise the deviation of the arm 5 from its correct position.

It will be appreciated that, by forming the reflecting surface 12 of the mirror 7 as a section of a cylinder, whose axis is parallel to the plane of the record surface and whose radius of curvature is equal to the distance from the arm pivot 6 to the reflecting surface 12, vertical motion of the arm 5, due for example to warping of a record, does not effect the reflection of light 13 from the surface 12.

It will also be appreciated that, although in the embodiment described, the source 1 emits visible light, it is possible to use light of a particular wavelength or other radiations than visible light.

Referring to FIG. 3, there is shown diagrammatically a further optical arrangement for use in detecting the deviation of a pick-up arm.

FIG. 3 shows at (a) a mirror 16 which is attached to the end of a pick-up arm (not shown). An objective lens 25 is arranged between a graticule 41 and the reflecting surface of the mirror 16, with the graticule 41 at the principal focus of the lens 25. The graticule 41 forming the reference object has, as can be seen from FIG. 4, a grid pattern which is interrupted in such a way that one quarter 42 of the pattern is half a line thickness out of phase in one direction with a half 43 of the pattern and the remaining quarter 44 of the pattern is half a line thickness out of phase in the other direction with the said half 43 of the pattern. Behind the grid pattern there is arranged an assembly 20, including, as can be seen from FIG. 3 at (b), a pair of light sensors 21 and 22 and a light source 23 arranged about an optical axis 26. It is not essential that the source 23 should be a source of visible radiations. Electromagnetic radiations in the infra-red range, from a Gallium Arsenide diode for example, might be convenient.

In operation, the one half 43 of the graticule pattern is illuminated by the source 23, the other half of the pattern, the two halves 42 and 44 of which are each half a line out of pitch in opposite directions with the said one half 43 of the pattern, is arranged in front of the sensors 21 and 22. The objective lens 25 forms a collimated image of the illuminated half 43 of the graticule 41 which is reflected by the mirror 16 and brought to a focus on the other half of the graticule 41. In the symmetrical situation when the mirror 16 is normal to the axis 26 of the optical assembly, the illumination received by the sensors 21 and 22 will be balanced. If the mirror 16 is rotated about an axis parallel to the graticule bars the reflected image moves over the graticule bars associated with the sensors 21 and 22 and it will be seen that a movement of one quarter of a line thickness of the bars in either direction will swing the outputs of the sensors 21 and 22 from a maximum of one sensor to a maximum of the other sensor. The differential connection of the outputs of the sensors 21 and 22 to a balanced amplifier 27 can thus be used to give signals suitable for controlling a servo system forming part of an actuator for a carriage such as that shown at 6a for the pick-up arm 5.

In addition to giving high sensitivity, the design gives good linearity as any non-uniformity of the detectors and emitters is averaged out by the graticule pattern. Graticules are readily made very uniform.

Many variations are possible, for example measurement on two axes using a graticule with a pattern of squares and a central emitter and 4 detectors, cross connected in different pairs. For a single axis device two emitters a.c. energised antiphase may be used with a single detector whose output passes to a phase sensitive demodulator.

The device may be used in any machine required to have automatic alignment control, such as on a parallel tracking arm record player, a self steering vehicle such as a trench digger or tunnelling shield, and in traditional metrology applications of measuring angle, straightness, squareness etc.

Although the invention has been described with reference to particular embodiments, it will be appreciated that variations and modifications can be made within its scope. For example in the embodiment of FIGS. 3 and 4 it is possible to use two light sources and one sensor and to arrange the graticule the other way round.

We claim:

1. In a phonograph having a pivoted pickup arm, apparatus for use in providing a signal which indicates an angular displacement of the arm in a first plane from a desired axis, while not being influenced by an angular displacement of the arm in a second plane at right angles to the first plane, the apparatus including a mirror mounted on the arm, a reflecting surface of the mirror having a planar cross-section in said first plane and a convex cross-section in said second plane plane, a sensor including a source of electromagnetic radiations and a detector of the radiations said detector having two detecting elements, with one element on either side of said second plane, each producing a signal which varies as a function of the amount of recieved radiation, means for mounting the said detector elements with respect to the mirror and the source that radiations from the source are reflected from the mirror to the detector elements, the relative amounts of radiation received by the respective elements being a function of the displacement of the arm from the desired axis, in said first plane whereby the arm can be moved according to the output from the detector elements to correct any angular displacement.

2. Apparatus according to claim 1 wherein axis, the source is arranged symmetrically about said second plane.

3. Apparatus according to claim 2 including a first pattern arranged between the source and the mirror, a second pattern arranged between the mirror and the detector elements, a third pattern arranged between the mirror and the detector elements and means for collimating the radiations passing from the said source to the mirror, the second and third patterns being in the same plane as and out of phase in opposite directions respectively by the same amount with the first pattern and the said first, second and third patterns being fixed relative to one another, whereby angular displacement of the mirror causes a differential output from the detector elements.

* * * * *